US010115086B2

(12) United States Patent
Kosloski et al.

(10) Patent No.: US 10,115,086 B2
(45) Date of Patent: Oct. 30, 2018

(54) SYSTEMS AND METHODS FOR DIRECTING A MONEY TRANSFER TO A RECEIVING PARTY ACCOUNT

(71) Applicant: Moneygram International, Inc., Minneapolis, MN (US)

(72) Inventors: Joel David Kosloski, Grand Prairie, TX (US); Mauricio Valdez, Denver, CO (US); Hal Steven Gronfein, McKinney, TX (US)

(73) Assignee: Moneygram International, Inc., Minneapolis, MN (US)

( * ) Notice: Subject to any disclaimer, the term of this patent is extended or adjusted under 35 U.S.C. 154(b) by 204 days.

(21) Appl. No.: 13/895,184

(22) Filed: May 15, 2013

(65) Prior Publication Data

US 2014/0344140 A1 Nov. 20, 2014

(51) Int. Cl.
*G06Q 40/00* (2012.01)
*G06Q 20/10* (2012.01)

(52) U.S. Cl.
CPC .................... *G06Q 20/10* (2013.01)

(58) Field of Classification Search
CPC ............... G06Q 20/10; G06Q 40/20
See application file for complete search history.

(56) References Cited

U.S. PATENT DOCUMENTS

| | | | |
|---|---|---|---|
| 6,748,367 B1* | 6/2004 | Lee ................... | G06Q 20/06 705/21 |
| 7,395,241 B1* | 7/2008 | Cook et al. ................... | 705/39 |
| 2002/0029193 A1* | 3/2002 | Ranjan et al. ................... | 705/39 |
| 2003/0233318 A1* | 12/2003 | King ................... | G06Q 20/02 705/39 |
| 2005/0232186 A1* | 10/2005 | Karaoguz ................... | H04L 29/06027 370/328 |
| 2006/0163345 A1* | 7/2006 | Myers ................... | G06Q 20/027 235/380 |
| 2009/0234746 A1* | 9/2009 | Jensen ................... | G06Q 20/105 705/17 |
| 2011/0004547 A1* | 1/2011 | Giordano ................... | G06Q 20/04 705/39 |
| 2011/0208600 A1* | 8/2011 | Aharoni ................... | G06Q 20/20 705/16 |
| 2012/0116967 A1* | 5/2012 | Klein ................... | G06Q 40/02 705/42 |
| 2013/0054455 A1* | 2/2013 | Hanson ................... | G06Q 40/02 705/42 |
| 2013/0060684 A1* | 3/2013 | Oskolkov et al. ............... | 705/40 |
| 2013/0103577 A1* | 4/2013 | Lawson et al. ................... | 705/39 |
| 2013/0325706 A1* | 12/2013 | Wilson et al. ................... | 705/40 |

FOREIGN PATENT DOCUMENTS

WO     WO-0195266 A2 * 12/2001 ............. G06Q 20/00
WO     WO-2011081952 A1 * 7/2011 ............. G06Q 20/10

* cited by examiner

*Primary Examiner* — Edward J Baird
(74) *Attorney, Agent, or Firm* — Norton Rose Fulbright US LLP

(57) ABSTRACT

Systems and methods which facilitate money transfer transactions to a receiving account are provided. Embodiments may provide for interaction between a money transfer service and one or more receiving account entities. Such interaction may be configured to cooperatively utilize transaction details in order to correctly route transferred funds to a receiving account. Embodiments may utilize this cooperation to prevent sensitive information from being widely distributed by parties which participate in a money transfer transaction.

21 Claims, 3 Drawing Sheets

SYSTEMS AND METHODS FOR DIRECTING A MONEY TRANSFER TO A RECEIVING PARTY ACCOUNT

TECHNICAL FIELD

The present application relates to money transfer transactions, and more specifically to systems and methods for facilitating money transfer transactions which are directed toward an account of a receiving party.

BACKGROUND

Generally speaking, money transfers are real-time transactions in that a transaction begins when a sender initiates the transaction at the time the money is to be sent to a receiving party. For example, a money transfer may be utilized in an emergency setting such as when a receiving party has an immediate need for funds. In such a transaction, a sender initiates a money transfer transaction with a money transfer service, such as with a local agent located within a MoneyGram® location. When the transaction information is gathered and the structure of the transaction is finalized, the sender provides the funds to a money transfer agent at or before the time that the funds of the transaction are actually transferred.

Once the funds are received at the time of the transaction, the agent may then provide a transaction code or some other form of transaction identifier to the sender. The sender will then provide the transaction code or identifier to the receiver. With this code the receiver may enter an agent location and complete the transaction and receive the transferred funds.

In some instances a money transfer transaction may be configured to send from a sending party directly to a bank account of a receiving party. Typically such transactions require very accurate target account information to be given by the sending party. For example, the sending party may need to provide a receiver's name, account information and/or name of a destination bank. The need for such information may be problematic when a sending party does not have precise information (e.g. a full formal name of the receiving party, precise name for a receiving bank, etc.), or when a receiving party may not want to provide the information to either the sending party or a money transfer service.

For a money transfer service, conducting a money transfer transaction efficiently is a primary concern. Inefficiency in a money transfer transaction causes additional administrative cost and potentially causes customer dissatisfaction. For transactions that are directed to a receiving party account, in the event that a portion of the transaction information is missing or inaccurate, inefficiencies arise wherein resources of the money transfer service will be required in order to complete or cancel the transaction.

BRIEF SUMMARY

The present application provides for systems and methods which facilitate money transfer transactions to a receiving account. Embodiments may provide for interaction between a money transfer service and one or more receiving account entities. Such interaction may be configured to cooperatively utilize transaction details in order to correctly route transferred funds to a receiving account. Embodiments may utilize this cooperation to prevent sensitive information from being widely distributed by parties which participate in a money transfer transaction. Further, embodiments may reduce errors and inefficiencies in transactions which are directed to a receiving account by allowing for additional information to be known or accessible by the money transfer service at the time of the transaction.

In accordance with one embodiment, a method for facilitating a money transfer transaction is provided. The method may include compiling, by a processing device, information regarding a third party account from a third party device. The compiled information may relate to a target account for a receiving party of said money transfer transaction. The method may further include receiving, by a processing device, details regarding a money transfer transaction from a sending party, and determining, by a processing device, a target account for the receiving party using the compiled third party account information and the received transaction details.

Another embodiment may be characterized as a method for facilitating a money transfer transaction. This method may include receiving details corresponding to a money transfer transaction at a sending agent device. Additionally, the method may include sending one or more received details to a central server, where the central server is configured to cooperatively process destination information for the money transfer transaction with a third party account server. Moreover, the method may include receiving confirmation from the central server that a target account for a receiving party has been identified, collecting funds for the money transfer transaction at the agent device, and directing the money transfer funds to the identified receiving party account.

Another embodiment provides for a computer program product having a non-transitory computer readable medium with code encoded thereon which, when executed causes one or more processing devices to: compile information regarding a third party account from a third party device, the information relating to a target account for a receiving party of said money transfer transaction; receive details regarding a money transfer transaction from a sending party; and determine a target account for the receiving party using the compiled third party account information and the received transaction details.

In yet another embodiment, an apparatus configured for implementing financial transactions is provided. The apparatus includes an agent computer having at least one processor and memory coupled to the at least one processor, wherein the at least one processor is configured to: receive details corresponding to a money transfer transaction at a sending agent device; send one or more received details to a central server, the central server configured to cooperatively process destination information for the money transfer transaction with a third party account server; receive confirmation from the central server that a target account for a receiving party has been identified; collect funds for the money transfer transaction at the agent device; and direct the money transfer funds to the identified receiving party account.

The foregoing has outlined rather broadly the features and technical advantages of the present invention in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of embodiments described herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present embodiments.

BRIEF DESCRIPTION OF THE DRAWINGS

For a more complete understanding, reference is now made to the following descriptions taken in conjunction with the accompanying drawings, in which.

DETAILED DESCRIPTION

Figure 1:
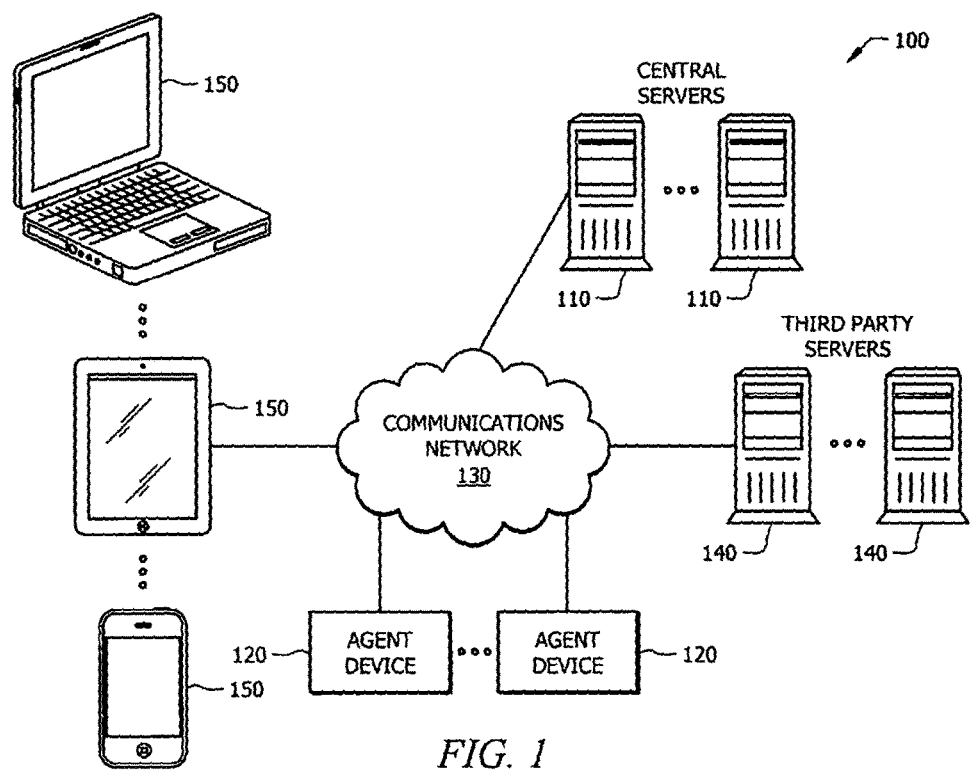
FIG. 1 illustrates a financial transaction computing network in accordance with an embodiment of the present application.

FIG. 1 illustrates a financial transaction computing network 100 in accordance with an embodiment of the present application. Financial transaction computing network 100 may include one or more central servers 110. Central servers 110 correspond to a central or parent entity which administers money transfer transactions between agent devices 120. Central servers 110 may be commonly located or distributed geographically. Additionally, the administration of a money transfer transaction and/or the configuration of one or more agent devices 120 may be implemented by a single server, or by using multiple processing resources of a plurality of servers.

Financial transaction computing network 100 further includes a communication network 130. Communication network 130 may include any type of network which allows for communication between central servers 110 and agent devices 120. For example, communication network 130 may comprise the Internet, WiFi, mobile communications networks such as GSM, CDMA, 3G/4G, WiMax, LTE, and the like. Further, communications network 130 may comprise a combination of network types working collectively.

Agent devices 120 correspond to one or more computing devices which are disposed at an agent location of a money transfer service. Such computing devices are configured with sufficient processing resources, memory, communications capabilities, and the like, to implement the functionality described herein. It is noted that in some embodiments an agent may have multiple devices at a particular location. Further, while only a small number of agent devices 120 are shown for the sake of simplicity, it is contemplated that financial transaction computing network 100 may include a very large number of agent devices 120 which are located worldwide. In some instances, multiple agent devices 120 may correspond to a particular chain of locations owned by an agent, while in other instances, an agent may have only a single location.

In some instances, particular groupings of agent devices 120 may be administered to by a pre-determined central server 110. Such a relationship may be established based on physical proximity of the devices and/or based on capabilities of the devices, e.g. processing resources, bandwidth availability, and the like. In other instances agent devices 120 may be administered to by a central server 110 based on other considerations, such as communication availability, processing resources, etc.

Central server 110 may be configured to compile information from one or more third party servers 130 which may be used to facilitate money transfer transactions to a receiving account. In some embodiments, information may be compiled prior to a transaction taking place. For example, a bank which administers a receiving account may register the account with the money transfer service. Such a registration may include providing central server 110 with information which will allow central server 110 to direct a money transfer transaction to the registered account upon receiving transaction information from a sending party.

In some embodiments, information may be complied by central server 110 from one or more third party servers 130 in real time, e.g. while the transaction is being processed. For example, a sending party may provide an agent device 120 with transaction information which includes the name of the receiving party. This information may be sent to central server 110 which may then poll one or more third party servers 140 for supplementary information regarding the receiving party which may be utilized to properly direct the money transfer transaction to a target account.

It is noted that in some embodiments, transactions may be implemented without the need to provide various parties with the account numbers or other sensitive information of the receiving party. For example, embodiments may be implemented where a sending party provides the money transfer service with a receiving party name and a destination bank. With this information, central server 110 may determine whether the receiving party's account is registered with the money transfer service and direct the funds to a registered party's account. It is noted that the account number of the receiving party may be provided to central server 110 by third party server 140 in order to properly direct the funds of the money transfer. In this manner, the account information does not necessarily need to be provided to the sending party to implement the transaction.

Additionally, third party server 140 may provide central server 110 with another type of identification means (other than the account number) which is known to the third party whereupon the money transfer service may direct the funds using this identification means. Accordingly, some embodiments may not require the money transfer service to know the receiving party's account number.

It is appreciated that the cooperation between the money transfer service and one or more third parties may enable a transaction to be implemented in a secure manner while controlling what information is distributed to the respective parties. This cooperation may also be utilized to remedy errors in a transaction in real time. For example, in the event that a sending party provides a nickname and a bank name for a receiving party, information from a third party server may be utilized to prompt a money transfer service to request further details because the given name appears to be invalid. Additionally, multiple banks may have similar names, but inquiring the multiple banks for information on directing funds, while also having the receiving party's name may allow for the proper bank to be determined. This determination may be implemented automatically, or with the assistance/confirmation of the sending party during the establishment of a transaction.

Network 100 may also include one or more user devices 150. User devices 150 may be any type of device which would facilitate the exchange of information within system 100. For example, user devices 150 may include computer systems, tablet devices, mobile telephones, and the like. Different embodiments may utilize different aspects of the types of client devices. For example, mobile telephones and tablet devices may have the ability to connect with various communications networks and may have different application execution capabilities. User devices 150 may be utilized before, during and after a money transfer transaction in any manner to facilitate convenient and secure transactions.

For example, a sending party may initiate a money transfer transaction from a user device 150 via an online connection or a dedicated application. The user device may communicate with one or more of central server 110 or an agent device 120 to initiate a transaction which is to be directed toward a receiving account. The send transaction may be completed using user device 150 (similar to how an agent device 120 would function), or a transaction may be staged or partly staged at the user device and the details may be later provided to an agent device 120 for completion of the transaction.

On the receiving side, a receiving party using user device 150 may be notified of a money transfer transaction via an online application, dedicated application, email, text, etc. Such a communication may notify a receiving party that a money transfer transaction has been sent to an account corresponding to the receiving party.

Figure 2:
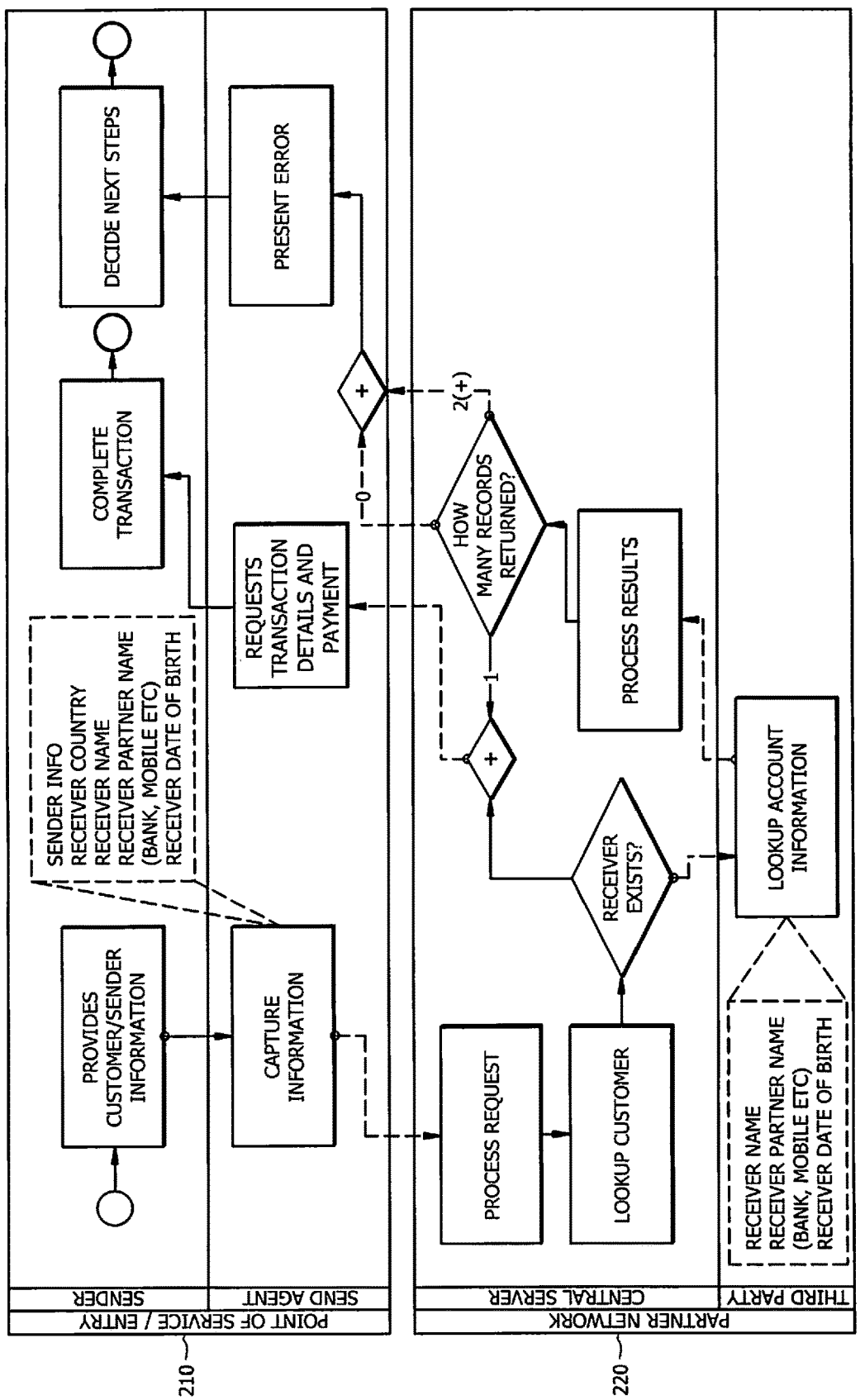
FIG. 2 illustrates a functional block diagram for an operational flow of a money transfer system in accordance with an embodiment of the present application.

FIG. 2 illustrates a functional block diagram for an operational flow 200 of a money transfer system in accordance with an embodiment of the present application. Operational flow 200 is broken into two sections, point of service/entry section 210 and partner network section 220. It is noted that the separations illustrated represent an example embodiment. In some aspects, functions may be implemented by different portions or devices. For example, point of service/entry section 210 comprises actions taken by a sending party/device 211 and a sending agent/device 212. It is appreciated that portions implemented by a sending agent/device may be implemented by a user, such as with user device 150.

According to flow 200, a transaction begins by a sending party providing transaction information. Such information may include sender information, receiving party information, receiver partner information (e.g. bank name), and in some cases it may include additional identifying information for a receiving party such as a date of birth, address, and the like. This transaction information is captured at an agent device and sent to a central server on partner network section 220 for transaction processing. The central server may determine whether the transaction may be directed to the receiving party based on the received information. For example, if the receiving party is known by the central server due to the party having been pre-registered, the central server can confirm that the transaction account destination is known. At this point, information from the central server may be utilized to finalize the transaction and funds may be provided by the sending party.

If the receiving party has not been pre-registered, the central server may contact a third party server which may be configured to look up account information for a receiving party. This lookup may utilize any of the information provided by the sending party to insure that the correct receiving party's account is located. The results from this account lookup are returned to the central server. Such results may be in any form which can be utilized to direct the funds of a transaction to the receiving party's account, e.g. the account information and routing information for the receiving party may be provided, a bank may return a transaction number or code which may be utilized by the money transfer service to identify the receiving account to the bank (wherein the bank may associate the transaction number to a particular account number), etc. If the receiving party/destination account has been adequately identified, the transaction may then be finalized at the money transfer agent and funds may be received by the sending party.

In some instances, the receiving party lookup may not yield adequate results. For example, a receiving party's account information may not be found. In another example, the lookup may yield multiple possible receiving parties based on the provided information (e.g. when a bank has two customers with the same name). In such instances, the central server may notify the money transfer agent and an error may be transmitted to the agent. At this point, the sending party may provide additional information to identify the receiving party (e.g. address information, birthdate information, and the like) and the lookup may be reattempted. It is notable that this error correction may be implemented in real time at the time of the transaction. Accordingly, errors in the transaction may be caught at the time that the sending party is initiating the money transfer transaction rather than after the transaction has been implemented and the funds have been rejected at a false destination.

It is further noted that embodiments may utilize the cooperation between the central server and the third party to reduce the amount of sensitive information which is shared between the multiple entities which take part in processing the money transfer transaction. For example, as shown above, the sending party does not need to provide the account number to the money transfer agent and the transaction may still be directed toward the receiving party's account. Further, the money transfer service does not necessarily need to retrieve the receiving party's account information so long as the money transfer service understands which third party to direct the funds and that the third party knows what account to post the funds. Alternatively, a sending party may provide the receiving party's account information and the described systems may be utilized to verify the accuracy of the provided information and may return an error in the event that the information cannot be verified.

In view of exemplary systems shown and described herein, methodologies that may be implemented in accordance with the disclosed subject matter will be better appreciated with reference to various functional block diagrams. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices.

Those skilled in the art will understand and appreciate that a methodology could alternatively be represented as a series of interrelated states or events, such as in a state diagram.

Figure 3:
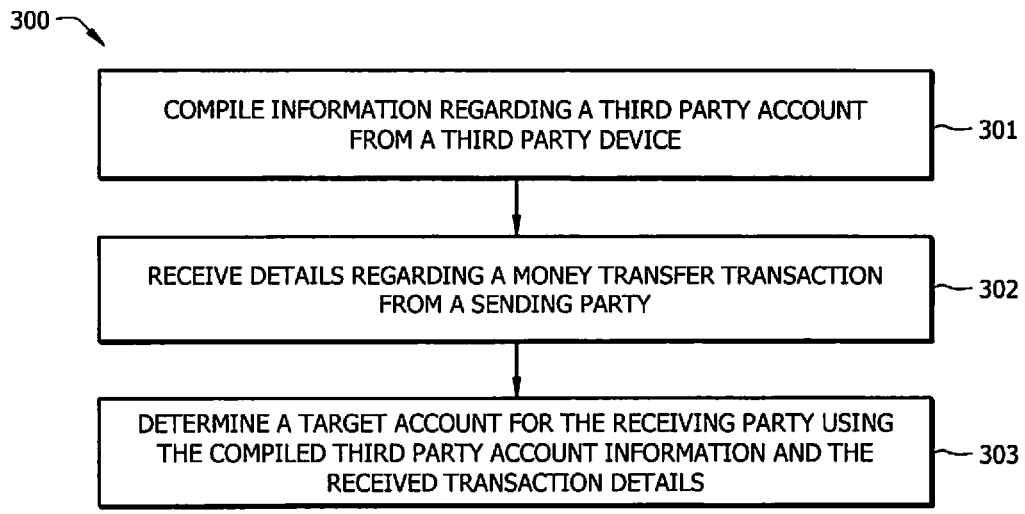
FIG. 3 illustrates a method for performing a financial transaction in accordance with an embodiment of the present application.

FIG. 3 illustrates a method 300 for performing a financial transaction in accordance with an embodiment of the present application. It is noted that method 300 may be implemented within one or more systems, such as systems 100 and 200 described above. Method 300 includes, at block 301, compiling information regarding a third party account from a third party device. As described above, such information may be compiled prior to a money transfer transaction occurring or in real time when a transaction is being established. Additionally, the information compiled may include account information, or separate codes or identifiers which correspond to an account of a receiving party.

Method 300 may further include, at 302, receiving details regarding a money transfer transaction from a sending party. Such details may include information regarding the receiving party, a destination bank for a receiving party's account, etc. Further, method 300 may include, at 303, determining a target account for the receiving party using the compiled third party account information and the received transaction details. In this manner, both a third party and a money transfer service may cooperatively process the money transfer transaction to a destination account administered by the third party.

Figure 4:
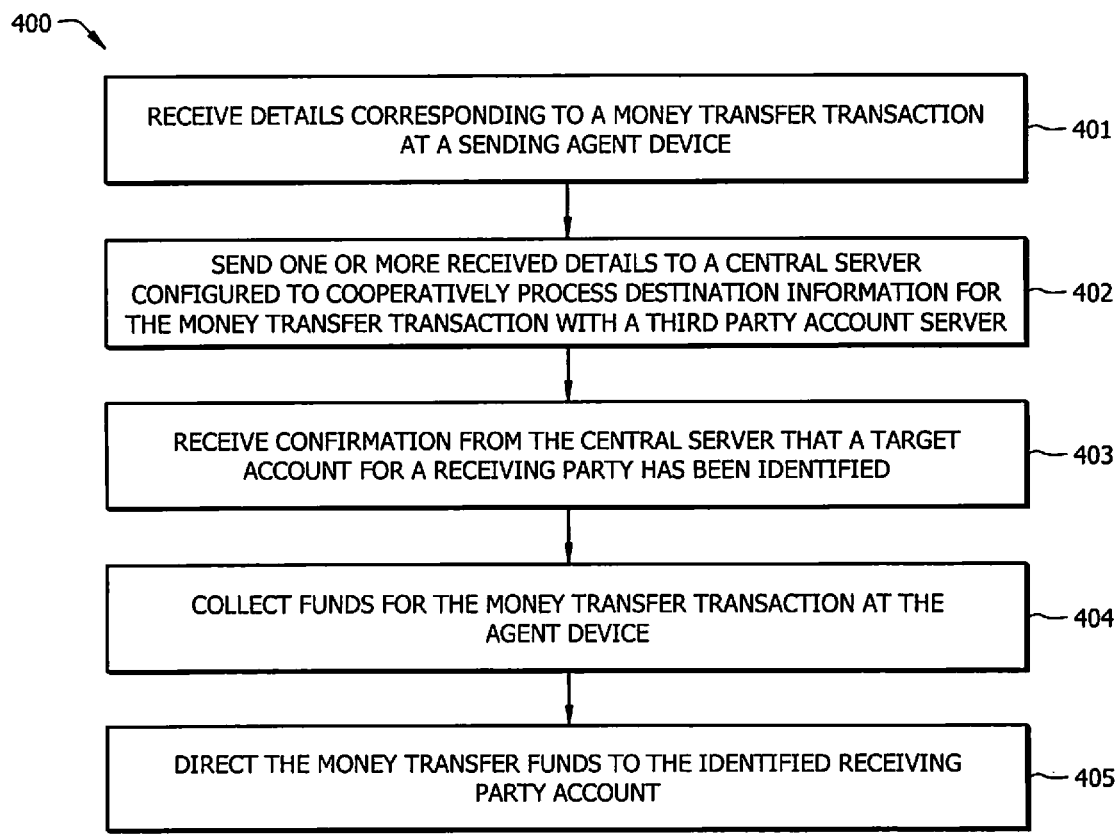
FIG. 4 illustrates a method for performing a financial transaction in accordance with an embodiment of the present application.

FIG. 4 illustrates a method 400 for performing a financial transaction in accordance with an embodiment of the present application. It is noted that method 400 may be implemented within one or more systems, such as systems 100 and 200 described above. Method 400 may include, at 401, receiving details corresponding to a money transfer transaction at a sending agent device. One or more received details may then be sent to a central server which is configured to cooperatively process destination information for the money transfer transaction with a third party account server at 402. Method 400 may further include, at 403, receiving confirmation from the central server that a target account for the receiving party has been identified. Upon the destination being identified, funds for the transaction may be collected at the agent device at 404 and the funds may be directed to the identified receiving party account at 405.

It is noted that the functional blocks and modules in FIGS. 1-4 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A money transfer network system, which has been configured to transfer money from a sending party to a target account that is not preregistered in the money transfer network system and is managed by a third party financial institution for a receiving party, wherein the money transfer network system includes one or more processing device operating over a communications network, said one or more processing device configured to:
    receive, from the sending party, transaction details of the money transfer, wherein the transaction details identify the receiving party, wherein the transaction details exclude an account number of the target account of the receiving party, and wherein the target account is not preregistered in the money transfer network system;
    acquire, from one or more financial institutions, information regarding one or more accounts managed by the financial institution;
    based at least on the received transaction details and at least some of the acquired information, determine, in real-time, that the transaction details fail to identify the target account;
    based at least on the determined failure, obtain additional transaction details that further identify the receiving party, wherein the additional transaction details exclude the account number of the target account;
    determine, in real-time after receiving the additional transaction details, that the transaction details and the additional transaction details successfully identify the target account;
    attain, from the third party, financial institution that manages the target account, account identification data that comprises a transaction code that identifies the target account and excludes the account number of the target account;
    based at least on the determined successful identification and the transaction code, direct funds of the money transfer to said target account without retrieving the account number of the target account.

2. The system of claim 1 wherein the acquired information is supplementary to the transaction details.

3. The system of claim 1 wherein the transaction details identify the receiving party only by name and destination financial institution.

4. The system of claim 1 wherein the transaction details identify the receiving party by at least one of: date of birth and address, while excluding the account number of the target account.

5. The system of claim 1 wherein the additional transaction details identify the receiving party by at least one of: name, destination financial institution, date of birth, and address, while excluding the account number of the target account.

6. The system of claim 1 wherein the one or more processing device receives the transaction details from a user device.

7. The system of claim 1 wherein the sending party does not know the account number of the target account.

8. A computer program product of a money transfer network system having a non-transitory computer readable medium with computer-code encoded thereon which, when executed, causes one or more computers operating over the money transfer network system to direct a money transfer network system to transfer money from a sending party to a target account that is not preregistered in the money transfer network system and is managed by a third party financial institution for a receiving party, the program product causing the one or more computers to:
    receive, from the sending party, transaction details of the money transfer, wherein the transaction details identify the receiving party, wherein the transaction details exclude an account number of the target account of the receiving party and wherein the target account is not preregistered in the money transfer network system;
    acquire, from one or more financial institutions, information regarding one or more accounts managed by the financial institution;
    based at least on the received transaction details and the acquired information, determine, in real-time, that the transaction details fail to identify the target account;
    based at least on the determined failure, obtain additional transaction details that further identify the receiving party, wherein the additional transaction details exclude the account number of the target account;
    determine, in real-time after receiving the additional transaction details, that the transaction details and the additional transaction details successfully identify the target account;
    attain, from the third party financial institution that manages the target account, account identification data that comprises a transaction code that identifies the target account and excludes the account number of the target account;
    based at least on the determined successful identification and the transaction code, direct funds of the money transfer to the target account without retrieving the account number of the target account.

9. The computer program product of claim 8 wherein the acquired information is supplementary to the transaction details.

10. The computer program product of claim 8 wherein the transaction details identify the receiving party only by name and destination financial institution.

11. The computer program product of claim 8 wherein the transaction details identify the receiving party by at least one of: date of birth and address, while excluding the account number of the target account.

12. The computer program product of claim 8 wherein the additional transaction details identify the receiving party by at least one of: name, destination financial institution, date of birth, and address, while excluding the account number of the target account.

13. The computer program product of claim 8 wherein the one or more processing device receives the transaction details from a user device.

14. The computer program product of claim 8 wherein the sending party does not know the account number of the target account.

15. A money transfer method, which directs a money transfer network system to transfer money from a sending party to a target account that is not preregistered in the money transfer network system and is managed by a third party financial institution for a receiving party, wherein the money transfer network system includes one or more processing device operating over a communications network, the method comprises:

receiving, from the sending party, transaction details of the money transfer, wherein the transaction details identify the receiving party, wherein the transaction details exclude an account number of the target account of the receiving party and wherein the target account is not preregistered in the money transfer network system;

acquiring, from one or more financial institutions, information regarding one or more accounts managed by the financial institution;

based at least on the received transaction details and the acquired information, determining, in real-time, that the transaction details fail to identify the target account;

based at least on the determined failure, obtaining additional transaction details that further identify the receiving party, wherein the additional transaction details exclude the account number of the target account;

determining, in real-time after receiving the additional transaction details, that the transaction details and the additional transaction details successfully identify the target account;

attaining, from the financial institution that manages the target account, account identification data that includes a transaction code that identifies the target account and excludes the account number of the target account;

based at least on the determined success and the transaction code, directing funds of the money transfer to said target account without retrieving the account number of the target account.

16. The method of claim 15 wherein the acquired information is supplementary to the transaction details.

17. The method of claim 15 wherein the transaction details identify the receiving party only by name and destination financial institution.

18. The method of claim 15 wherein the transaction details identify the receiving party by at least one of: date of birth and address, while excluding the account number of the target account.

19. The method of claim 15 wherein the additional transaction details identify the receiving party by at least one of: name, destination financial institution, date of birth, and address, while excluding the account number of the target account.

20. The method of claim 15 wherein the one or more processing device receives the transaction details from a user device.

21. The method of claim 15 wherein the sending party does not know the account number of the target account.

* * * * *